Figure 1:
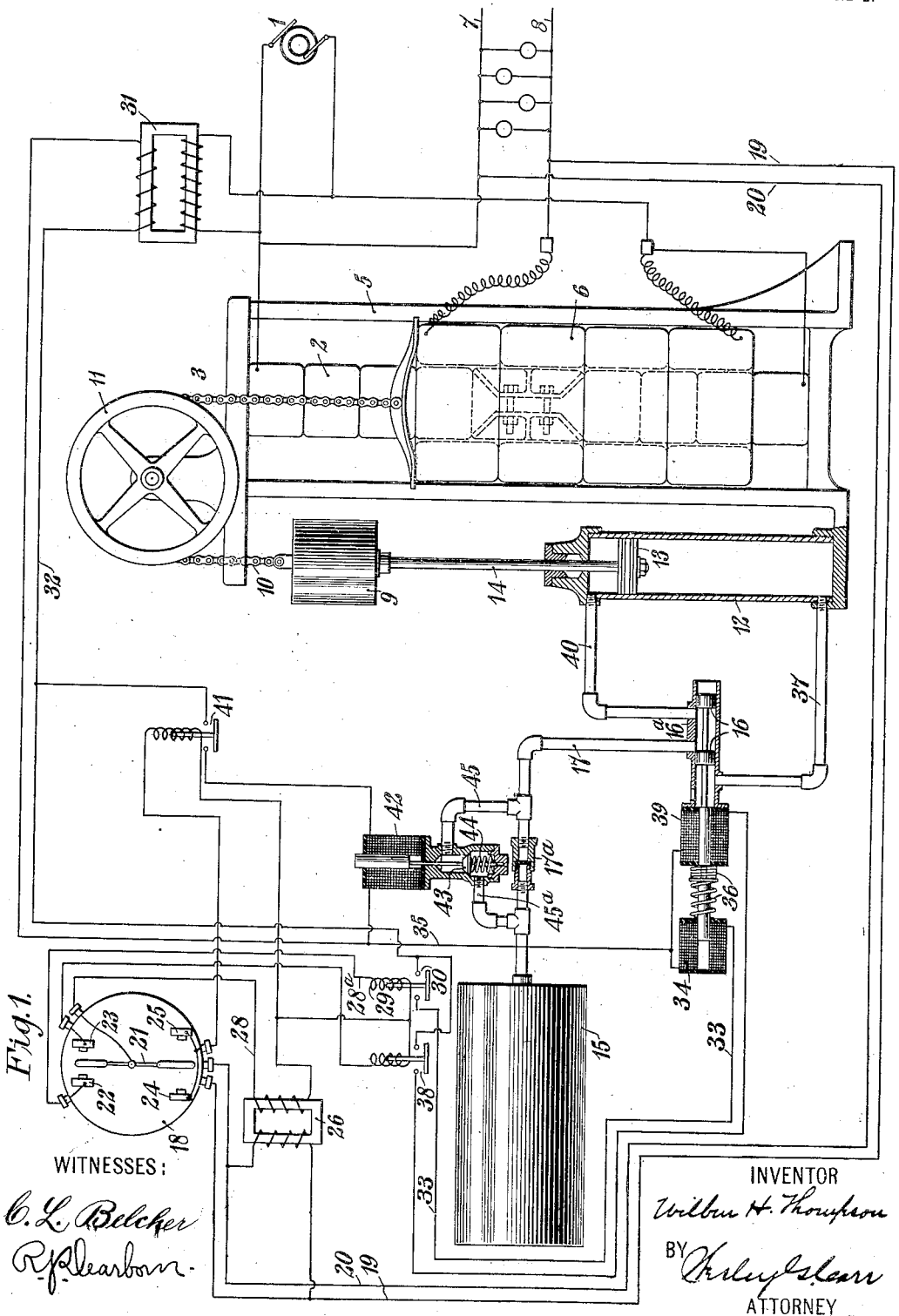

No. 851,709. PATENTED APR. 30, 1907.
W. H. THOMPSON.
POTENTIAL REGULATOR.
APPLICATION FILED JUNE 25, 1906.

2 SHEETS—SHEET 1.

WITNESSES:
C. L. Belcher
R. P. Dearborn

INVENTOR
Wilbur H. Thompson
BY
ATTORNEY

No. 851,709. PATENTED APR. 30, 1907.
W. H. THOMPSON.
POTENTIAL REGULATOR.
APPLICATION FILED JUNE 25, 1906.
2 SHEETS—SHEET 2.
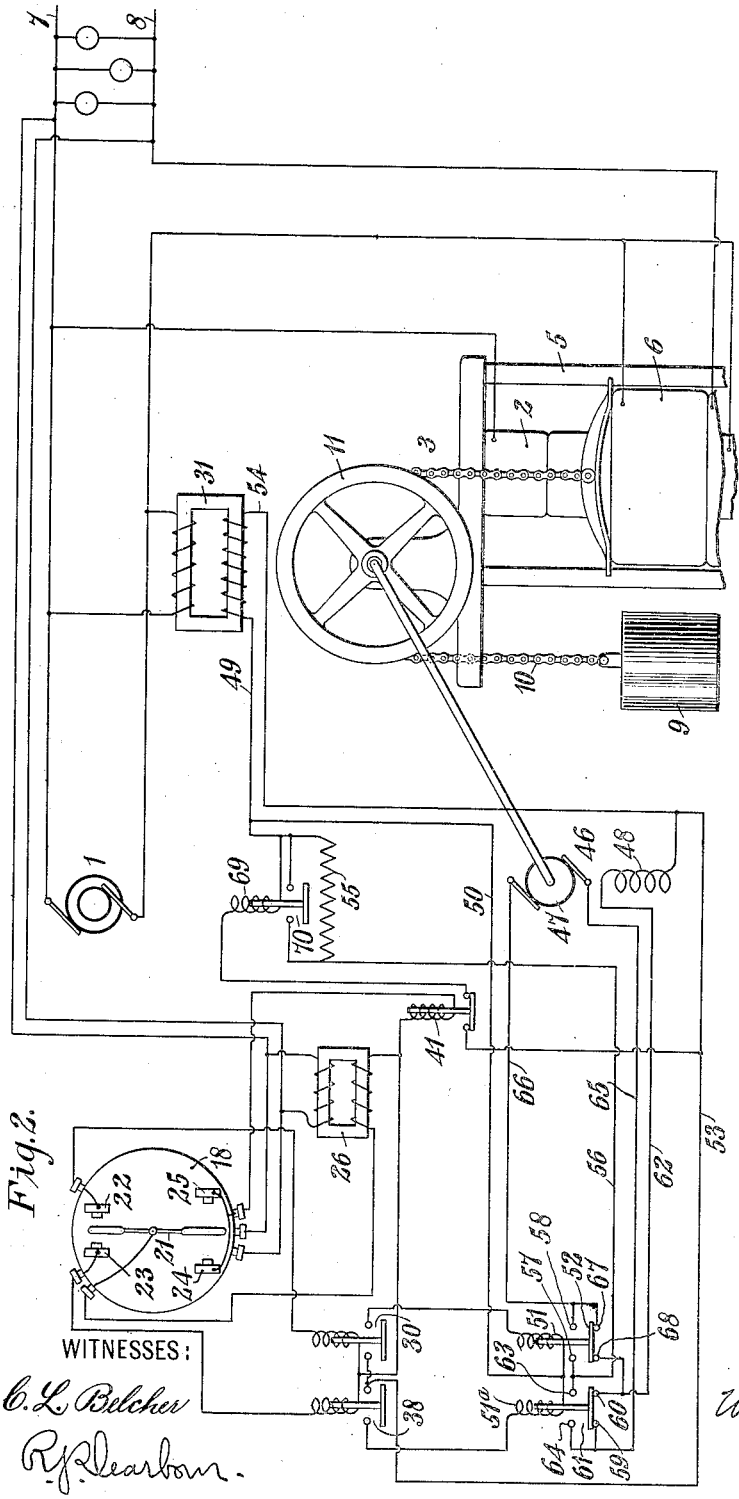
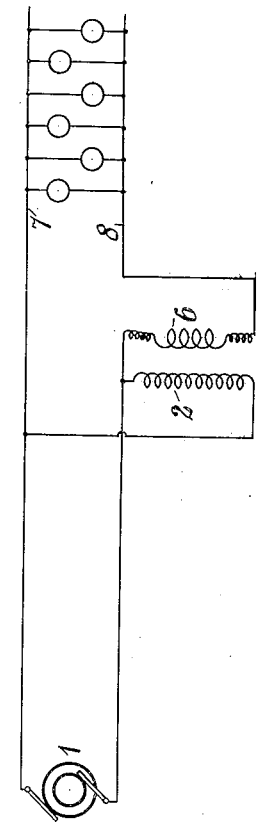
WITNESSES:
C. L. Belcher
R. P. Dearborn
INVENTOR
Wilbur H. Thompson
BY
Shirley G. Carr
ATTORNEY

UNITED STATES PATENT OFFICE.

WILBUR H. THOMPSON, OF WILKINSBURG, PENNSYLVANIA, ASSIGNOR TO WESTINGHOUSE ELECTRIC & MANUFACTURING COMPANY, A CORPORATION OF PENNSYLVANIA.

POTENTIAL-REGULATOR.

No. 851,709.   Specification of Letters Patent.   Patented April 30, 1907.

Application filed June 25, 1906. Serial No. 323,305.

*To all whom it may concern:*

Be it known that I, WILBUR H. THOMPSON, a citizen of the United States, and a resident of Wilkinsburg, in the county of Allegheny and State of Pennsylvania, have invented a new and useful Improvement in Potential-Regulators, of which the following is a specification.

My invention relates to systems of regulation for electric circuits and has special reference to systems that comprise movable-coil transformers which are adapted to automatically maintain a substantially constant potential upon an electric circuit.

The object of my invention is to provide, in a regulating system of the class above indicated, means for automatically actuating the movable coils of the transformer regulator to correct variations in the electromotive force of the energy received from the source of supply, that shall give a quick action in response to a considerable variation, without vibrating about the position which the movable coil should occupy, when the variations are relatively slight.

A well known form of potential regulator comprises a transformer having groups of relatively movable coils the positions of which may determine the ratio of the electromotive forces in the groups. These coils have usually been moved either by electric motors or by fluid-pressure cylinders. In order to make the action of the regulator automatic, meter relays have been employed, which, when motors were used, completed the motor circuits for rotation in the one or the other direction, as variations in the electromotive force occurred. When fluid-pressure devices were employed, a circuit was completed through one valve magnet when the line electromotive force rose above a predetermined amount, and a circuit was completed through another valve magnet when the electromotive force fell below a predetermined amount, the valve magnets being arranged to selectively admit fluid-pressure to the ends of the cylinder.

If a relatively high voltage is applied to the motor or if a high fluid-pressure is suddenly admitted to the cylinder when only a slight variation from the desired line voltage occurs, the moving coil will be carried past the position which it should occupy so that the meter relay immediately reverses the motor or admits fluid-pressure to the opposite end of the cylinder and the coil, instead of coming to rest in the desired position, will fluctuate back and forth. This fluctuating or pumping may be avoided by materially reducing the voltage applied to the motor or the fluid-pressure admitted to the cylinder, but the action of the system becomes very much slower and when a relatively large variation in voltage is to be corrected, a considerable time is required.

In order to correct large variations in a relatively short length of time without involving the fluctuating action of the mechanism hereinbefore described when slight variations are to be corrected, I provide, with the electric motor driven regulator, a resistance in series with the motor and automatically short-circuit the same when large variations occur. In the fluid-pressure system, I provide a reducing valve between the source of the fluid-pressure and the selecting valve which determines the end of the cylinder to which pressure is applied. In this way, the action of the cylinder is sufficiently slow to avoid an excessive movement of the coils when slight variations are being corrected and the action is quickened when relatively large variations in voltage are being corrected by opening a shunt path for the fluid-pressure around the reducing valve. In this way, the speed of correction is automatically determined by the amount of variation to be corrected.

My invention is illustrated in the accompanying drawings in which

Figure 1 is a diagrammatic view of a system arranged in accordance therewith. Fig. 2 is a similar view of a modified system in which an electric motor is employed for changing the position of the coils and Fig. 3 is a simple diagram showing the main circuits of the systems shown in Figs. 1 and 2.

Referring to Figs. 1 and 3 of the drawings, single-phase electrical energy is supplied from generator 1 to a primary and stationary winding 2 of a regulating transformer 3. The transformer comprises a core member 4, a stationary supporting frame 5 and movable secondary coils 6, the positions of which, relative to the stationary coils 2, determines the electromotive force ratio between the primary and secondary coils. The movable coils 6 are connected to an electric circuit 7–8, which is supplied therefrom. The weight of the moving coils is counterbalanced by a mass 9 that is connected to the coils by a cable or a chain 10 which passes over a sleeve or pulley 11. The position of the moving coils is determined by a fluid-pressure cylinder 12 having a piston 13 that is connected to the mass 9 by a rod 14. Fluid-pressure may be selectively admitted to either end of cylinder 12 from a storage tank 15 by a piston valve 16, the cylinder 16$^a$ of which is directly connected to the storage tank by a length of pipe 17, in which a reducing valve 17$^a$ is located. The position occupied by the piston valve 16 is automatically determined by a meter relay 18, which is connected across the feeder circuit 7–8 by conductors 19 and 20 and which comprises a moving contact arm 21 and a plurality of stationary contact members 22, 23, 24 and 25. One end of the movable contact arm 21 is flexible and the stationary contact members 22 and 23 are engaged by this flexible end, before the opposite extremity engages the stationary members 24 and 25, which are more widely separated. When the electromotive force applied to the feeder circuit 7–8 rises slightly above a predetermined amount, the movable contact arm 21 moves into engagement with the stationary contact member 22. Energy is then supplied from any convenient source, such as a transformer 26, through conductor 28, movable contact arm 21, stationary contact member 22, conductor 28$^a$ and magnet winding 29 to the opposite terminal of transformer 26. The energizing of the electromagnet 29 closes a switch 30 and energy is supplied from a transformer 31 through conductor 32, switch 30 and conductor 33 to the winding of a valve magnet 34, from which point the circuit is completed through conductor 35. The energizing of the valve magnet 34 moves the piston valve 16 to one extremity of its travel in opposition to a centering spring 36, and fluid-pressure is admitted through a pipe 37 to the lower end of the cylinder 12. When the fluid-pressure is admitted in this manner, the position of the moving coil 6 is changed so as to correct the variations in electromotive force which occur in the feeder circuit 7–8. In a similar manner, a slight decrease in the electromotive force from a predetermined amount moves the contact member 21 into engagement with the stationary contact member 23 and energy is then supplied from the transformer 31, through a relay switch 38 to a magnet winding 39. The electro-magnet 39 then moves the piston valve in the opposite direction, and fluid-pressure is admitted, through a pipe 40, to the upper end of the cylinder 12 to effect a movement of the coil 6 in the opposite direction. If a considerable variation in the voltage of the feeder circuit 7–8 occurs, the opposite extremity of the movable arm 21 is forced into engagement with the one or the other of the stationary contact members 24 and 25. In either case, energy is supplied to the magnet of a relay switch 41, and when this switch is closed, energy is supplied from the transformer 31 through switch 41 to an electro-magnet 42, circuit being completed from this point through the conductor 35. The energizing of the magnet winding 42 opens a valve 43 in opposition to a spring 44, whereupon fluid-pressure is supplied through shunt pipes 45 and 45$^a$ to the cylinder 16$^a$ without passing through the reducing valve 17$^a$. In this way, a moderate action of the regulator corrects a slight variation of the electro-magnet force at the feeder circuit and a quick action of the regulator is effected by a sudden admission of pressure from the storage tank when a considerable variation in electromotive force is to be corrected.

Referring to Fig. 2, an electric motor 46 is substituted for the pneumatic cylinder 12 of Fig. 1 for effecting the desired motion of the movable coil 6 of the regulator 3. The motor 46 comprises an armature 47 and a series field magnet winding 48 and is arranged to produce rotation of the pulley 11 in the one direction or the other. The meter relay 18 effects the closure of either switch 30 or switch 38, according to the electromotive force of the circuit 7–8. When the switch 30 is closed, a circuit is completed from a terminal 49 of the transformer 31, through conductor 50, magnet winding 51 of a switch 52, switch 30 and conductor 53 to the opposite terminal 54 of the transformer. The energizing of the winding 51 closes the switch 52 and a circuit is then completed from the terminal 49 of the transformer 31 through a resistance 55, conductor 56, contact members 57 and 58 of switch 51, armature 47 of the motor 46, contact members 59 and 60 of a switch 61, which is open, conductor 62 and the series field magnet winding 48 of the motor 46 to the terminal 54 of the transformer. When the switch 38 is closed, as hereinbefore explained in connection with Fig. 1, circuit connections are similarly completed through transformer 31, conductor 50, magnet winding 51$^a$ of the switch 61, switch 38 and conductor 53 to the terminal 54 of the transformer. The energizing of the magnet winding 51$^a$ closes the switch 61 and completes a circuit from the transformer 31, through resistance 55, conductor 56, contact members 63 and 64 of the switch 61, conductor 65, armature 47, conductor 66, contact members 67 and 68 of the switch 52, which is now open, conductor 62 and series field magnet winding 48 of the motor 46. The resistance 55 is so designed as to restrict the motor 46 and the coil 6 to a relatively slow motion, and corresponds to the reducing valve 17 of Fig. 1, since both prevent a sudden change in the relative position of the stationary and movable coils of the regulator when only a slight variation occurs in the electromotive force. If a considerable variation in the voltage of the circuit 7–8 occurs, the switch 41 will be closed, as hereinbefore explained in connection with Fig. 1. When the switch 41 is closed, energy is supplied from the transformer 31 to a magnet winding 69 of a switch 70, and the closure of this switch short-circuits the resistance 55, thereby materially increasing the voltage applied to the motor 46 when a considerable variation in electromotive force in the circuit 7–8 is to be corrected.

I desire that my invention shall be construed to cover variations which obtain similar results and that only such limitations be imposed as are indicated in the appended claims.

I claim as my invention:

1. In a transformer regulator, the combination with relatively movable coils and a fluid-pressure actuating device therefor, of means for regulating the fluid-pressure supplied to the actuating device that is dependent upon the amount of variation in the element corrected by the regulator.

2. In a transformer regulator, the combination with relatively movable coils and actuating means for varying the relative positions of the coils, of means for varying the speed at which the change in position takes place that is dependent upon the amount of correction required.

3. In a transformer regulator, the combination with stationary coils, movable coils and a fluid-pressure cylinder, of means for varying the fluid-pressure admitted to the cylinder that is dependent upon the amount of variation in the element corrected by the regulator.

4. In a transformer regulator, the combination with stationary coils and movable coils, of means for slowly actuating the movable coils when a predetermined correction is required and for rapidly actuating the movable coils when the correction required exceeds a predetermined amount.

5. In a transformer regulator, the combination with stationary coils, movable coils and a fluid-pressure cylinder, of means for slowly actuating the movable coils when a predetermined correction is required and for rapidly actuating the movable coils when the correction required exceeds a predetermined amount.

6. In a transformer regulator, the combination with stationary coils, movable coils and a fluid-pressure cylinder which changes the relative positions of the stationary and movable coils, of means for automatically regulating the rapidity of the action that is dependent upon the amount of regulation required.

7. In a transformer regulator, the combination with stationary coils, movable coils and a fluid-pressure cylinder for varying the relative positions of the coils, valve magnets which determine the end of the cylinder to which the fluid-pressure is admitted, of means for automatically regulating the rapidity of the action that is dependent upon the amount of regulation required.

8. In a transformer regulator, the combination with stationary coils, movable coils, a fluid-pressure actuating cylinder therefor, a reducing valve and means for admitting air through the valve to either end of the cylinder, of means for shunting the reducing valve to admit full pressure to the cylinder.

9. In a transformer regulator, the combination with stationary coils, movable coils, a fluid-pressure actuating cylinder therefor, a reducing valve and means for admitting air to either end of the cylinder, of automatic means for shunting the reducing valve that is dependent upon a predetermined variation in the element to be corrected by the regulator.

10. In a constant potential regulator, the combination with stationary coils, movable coils, a meter relay device and a movable contact arm therefor, two pairs of stationary coöperating contact members, one pair of which is adapted to be engaged when slight variations in the potential occur and the other pair of which is adapted to be engaged when a considerable variation occurs, of a fluid-pressure cylinder which determines the relative positions of the movable and stationary coils, a selective admission valve therefor, electro-magnets which control the action of the valve, and means for admitting an increased pressure to the cylinder that is dependent upon a considerable potential variation.

11. In a transformer regulator, the combination with an electric circuit, relatively movable coils, and means for automatically adjusting their positions to obtain a substantially constant potential in the circuit, of means for producing a relatively rapid change in the position of the coils when a predetermined variation occurs in the potential to be governed.

12. A potential regulator comprising relatively movable coils, an actuating device, a retarder for the actuating device and means for shunting the retarder when large variations in potential occur.

In testimony whereof, I have hereunto subscribed my name this 20th day of June, 1906.

WILBUR H. THOMPSON.

Witnesses:
BIRNEY HINES,
VERYL B. BROUGHTON.